Patented Mar. 27, 1923.

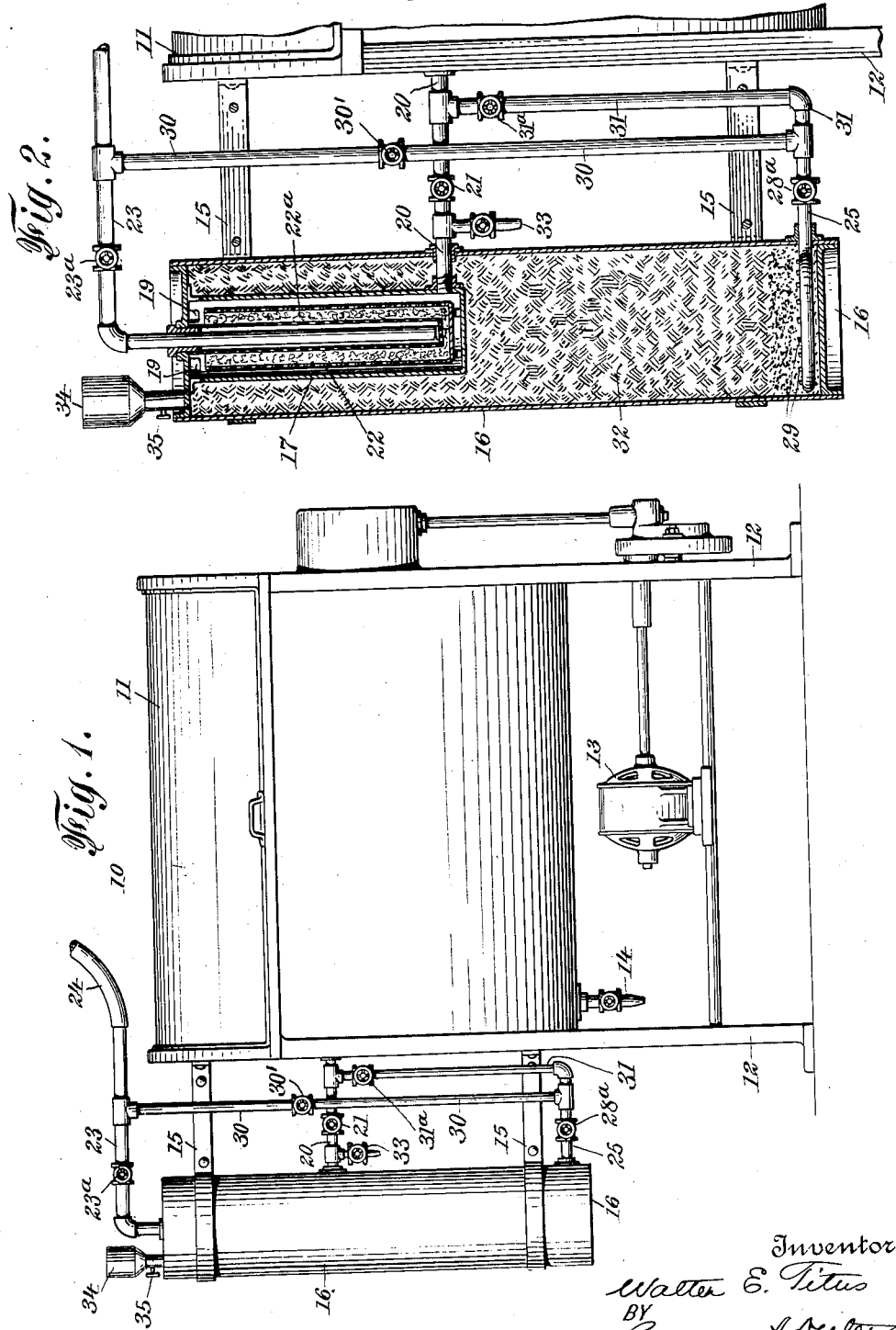

1,450,054

UNITED STATES PATENT OFFICE.

WALTER E. TITUS, OF BROOKLYN, NEW YORK.

WATER-TREATING ATTACHMENT FOR WASHING MACHINES, ETC.

Application filed April 4, 1921. Serial No. 458,319.

*To all whom it may concern:*

Be it known that I, WALTER E. TITUS, a citizen of the United States, residing at the city of New York, borough of Brooklyn, county of Kings, in the State of New York, have invented certain new and useful Improvements in Water-Treating Attachments for Washing Machines, Etc., of which the following is a full, clear, and exact specification.

My invention relates to improvements in washing machines, and the same has for its object more particularly to provide a machine in which the water used for washing may be modified before it enters the receptacle in which the clothes are wished.

Further, said invention has for its object to provide a machine with means whereby the water used may be filtered or modified, or both filtered and modified, before the same enters the receptacle in which the washing operations are performed.

Further, said invention has for its object to provide a machine with means whereby the water used may be caused, at will, to enter directly the receptacle in which the washing operations are performed, or first to enter and pass through the filtering or modifying means, or both thereof before entering the washing receptacle.

Other objects will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawings—
Figure 1 is a side elevation showing a portable washing machine provided with one form of water treating apparatus constructed according to and embodying my said invention, and Fig. 2 is an enlarged sectional view taken centrally through the receptacle for treating the water.

In said drawings, 10 designates a washing machine which may be of any desired form or type. For the purposes of this application, the same is shown as comprising a cylindrical washing container 11 supported in elevated position upon legs 12. Within the container 11 may be located any suitable agitating mechanism which is operated by an electric motor 13 arranged below the base of the container 11. The container 11 is provided at its base with a suitable draw-off cock 14.

At one side of the container 11 are arranged brackets 15, 15, each of which has one end secured to the side wall of the receptacle 11, and its free end provided with a circular member to receive and support a filtering and water modifying apparatus comprising a cylindrical receptacle 16 which is closed at its top and bottom. Within the receptacle 16 is arranged a relatively smaller inner casing 17 which is secured at its upper end to the under side of the top of the cylindrical receptacle 16 by bolts or screws 18. The inner casing 17 is provided along its upper edge with cut-away portions forming openings 19 for the passage of water. 20 denotes a pipe which is connected at one end to the lower end of the inner casing 17, and has its other end extending outwardly through the receptacle 16 and connected to the washing container 11. Intermediate the receptacle 16 and the container 11, the pipe 20 is provided with a valve 21.

Within the inner casing 17, and free from the walls thereof, is disposed a smaller perforated filter receptacle or strainer 22 which is filled with a suitable filter mass $22^a$ to remove the raw water any impurities or matter which may be suspended therein.

23 denotes an inlet pipe which is adapted to be connected at one end by a hose 24 with a suitable source of raw water supply. The other end of said pipe 23 extends through the top of the receptacle 16 and communicates with the interior of the perforated filter receptacle or strainer 22. The pipe 23 is provided adjacent to the top of the receptacle 16 with an inlet valve $23^a$.

25 denotes a pipe which extends into the receptacle 16 adjacent to its base, and is provided at its outer projecting portion with a valve $28^a$. and at its inner end, within the receptacle 16, with a series of apertures or nozzles 29. 30 denotes a branch pipe which extends from the supply pipe 23 to the pipe 28, and is provided with a valve 30'. 31 denotes a pipe which extends from the junction of the pipe 28 and branch pipe 30 to the pipe 20 extending from the bottom of the inner casing 17 to the washing container 11. The pipe 31 is provided adjacent to the pipe 20 with a valve $31^a$.

The interior of the receptacle 16 is filled with a suitable water softening or modifying agent 32, such, for example, as zeolite, which extends substantially to the top of the receptacle 16, and by preference is disposed upon a bottom layer or strata of coarse material, such as sand. The character of the specific water modifying medium will, of course, depend upon the nature, character and quality of the particular water which is to be softened or treated.

By means of my invention, the operator is enabled, at will, to supply to the washing container 11 raw water; filtered and softened water; only filtered water; or softened and unfiltered water.

To supply water as above specified, it merely becomes necessary to manipulate the valves whereby the direction of the flow may be changed or controlled.

For example, if it is desired to supply raw water direct as it is received from the source of supply, it merely becomes necessary to open the valves 31$^a$ and 30′ and to close the valves 23$^a$, 28$^a$ and 21. When this has been done, the water will be through the pipe 23, pipe 30, valve 30′, pipe 31, valve 31$^a$ and pipe 20 to the washing container 11.

To supply filtered and modified water to the washing container 11, the valves 23$^a$, 28$^a$ and 31$^a$ are opened, and the valves 21 and 30′ closed. The course of the water will now be as follows: through pipe 23, valve 23$^a$, through the filter 22, casing 17, receptacle 16, pipe 20 and valve 21, to the washing container 11.

To supply only filtered water, the valve 23$^a$ in the supply pipe 23 and the valve 21 in the pipe 20 are opened, and the valves 28$^a$, 31$^a$ and 30′ closed, whereupon the course of the water will be as follows: through pipe 23 to the filter and strainer 22, inner casing 17 and thence by the pipe 20 to the washing container 11.

When it is desired to supply softened unfiltered water, the valves 20$^a$, 28$^a$ and 21 are opened, and the valves 23$^a$ and 31$^a$ closed. Hereupon the course of the water will be as follows: through pipe 23, valve 30′, pipe 30, valve 28$^a$ through the softening medium into the inner casing 17, through the openings 19 at the top thereof, thence through said inner casing 17 to the pipe 20 and through the valve 21 to the washing container 11.

When it is desired to "back wash" or clean the filtering and softening mediums, the valves 30$^a$, 28$^a$ and 21 are opened, and the valves 23$^a$ and 31$^a$ closed. Hereupon the course of the water will be as follows: through pipes 23 and 30, valves 30$^a$, 28$^a$, receptacle 16 through the modifying mass, through the openings 19 in the inner casing 17 and filter receptacle 22, and thence pass from the bottom of said inner casing 17 through the pipe 20 and valve 21 to the washing container 11, whence it will be discharged through the draw-off cock 14 in the base thereof.

In order to permit of the cleaning and washing out of the water filtering and modifying apparatus, the portion of the pipe 20 intermediate the receptacle 16 and valve 21 may be provided with a draw-off cock 33, having a nozzle 33$^a$ to permit of the attachment of a hose for conducting the fluid to a suitable waste outlet.

34 denotes a funnel which is secured to the top of receptacle 16 and provided with a valve 35, to permit of the introducing of salt into the receptacle for the purpose of regenerating the modifying medium.

It is to be noted that while I have shown my invention in combination with a portable washing machine that the same is not limited to machines of that type, as the same may be readily applied to or combined with the larger or fixed containers for holding water, as required for laundry and other purposes.

Having thus described my said invention what I claim and desire to secure by Letters Patent is:

1. The combination of a container with a water treating apparatus comprising a receptacle adapted for connection with a source of water supply, said apparatus embodying a filter and a water modifying agent, means for connecting said receptacle and said filter severally with said container, and valve mechanism for controlling the flow of water from its source to said container and through said filter and said modifying agent severally or jointly, substantially as specified.

2. The combination of a container with a water treating apparatus comprising a receptacle, a pipe connecting said receptacle with a source of water supply, said receptacle containing a filter, a casing surrounding said filter provided with discharge openings, a pipe connecting said casing with said container, a pipe connecting said first-named receptacle with the pipe connecting said first-named receptacle and said container, a branch pipe connecting said supply pipe with the pipe connecting said first-named receptacle with the pipe connecting said casing and said container, and valve mechanism in said pipes whereby to supply to said container, at will, raw water, filtered water, modified water, and filtered and modified water, substantially as specified.

3. The combination of a container with a water treating apparatus comprising a receptacle, a filter and a water modifying agent in said receptacle, a pipe leading from a source of raw water supply and severally communicating with said filter and said receptacle, a casing enclosing said filter, a pipe connecting said enclosing casing with said container, a branch pipe connection leading from the source of raw water supply to said first-named receptacle and to the pipe connecting said enclosing casing with said container, and valves in said pipes and branch pipes whereby to supply to said container, at will, raw water, filtered water, modified water or filtered and modified water, substantially as specified.

4. The combination of a container with a water treating apparatus comprising a receptacle, means for securing said receptacle to said container, a filter secured within said receptacle adjacent to the top thereof and comprising a perforated receptacle, a filter mass therein, a casing secured at its upper end to the top of said receptacle and enclosing said perforated receptacle; said casing being provided adjacent to its upper edge with apertures, a water modifying medium disposed in said receptacle, a water supply pipe secured to said receptacle and communicating with the perforated filter receptacle therein, a pipe communicating with the lower end of the casing surrounding said filter receptacle and communicating with said container, a pipe secured to the base of said receptacle and to the pipe connecting said filter casing with said container, a branch pipe connecting said water supply pipe with the pipe extending from the base of said receptacle to the pipe connecting said filter casing with said receptacle, and valves provided in said water supply pipe, the pipe connecting said filter casing with the receptacle, the pipe connecting the base of said receptacle with said last-named pipe, and the branch pipe connecting the pipe extending from the base of the receptacle with said water supply pipe, whereby to supply to said container, at will, raw water, filtered water, modified water or filtered and modified water, substantially as specified.

Signed at the city of New York, in the county and State of New York, this first day of April, one thousand nine hundred and twenty-one.

WALTER E. TITUS.

Witnesses:
CONRAD A. DIETERICH,
LOUIS B. HARSBROUCK.